US006389383B1

(12) United States Patent
Sarathy et al.

(10) Patent No.: US 6,389,383 B1
(45) Date of Patent: May 14, 2002

(54) SYSTEM AND METHOD FOR INTERFACING SOFTWARE AND HARDWARE

(75) Inventors: Vijaya B. P. Sarathy; Krishnan K. Rama; Sukanya Venkatesan, all of Banglore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/373,566

(22) Filed: Aug. 13, 1999

(51) Int. Cl.$^7$ .............................................. G06F 13/00
(52) U.S. Cl. ............................... 703/21; 714/38; 716/6; 717/1; 717/2; 709/238
(58) Field of Search ....................... 703/22, 21; 714/38, 714/45; 716/6; 717/1, 2, 3, 4; 709/238, 223

(56) References Cited

U.S. PATENT DOCUMENTS

| | | | | |
|---|---|---|---|---|
| 5,911,074 A | * | 6/1999 | Leprince et al. | 395/703 |
| 5,978,578 A | * | 11/1999 | Azarya et al. | 395/701 |
| 6,117,181 A | * | 9/2000 | Dearth et al. | 703/22 |
| 6,272,341 B1 | * | 8/2001 | Threadgill et al. | 455/428 |
| 6,279,124 B1 | * | 8/2001 | Brouwer et al. | 714/38 |

\* cited by examiner

Primary Examiner—Kevin J. Teska
Assistant Examiner—T. Phan
(74) Attorney, Agent, or Firm—Robert L. Troike; Frederick J. Telecky, Jr.

(57) ABSTRACT

A system (100) for interfacing hardware and software components in a simulation system is disclosed. The present invention includes at least one cell (110) having a model access and control hub (140) and at least one block (142) within the cell (110) connected to the model access and control hub (140). The block (142) executes a command (196) sent by the model access and control hub (110). The present invention also includes an interprocess communication device (104) including shared memory (105) coupled to the model access and control hub (140). The shared memory (105) communicates the command (196) to the model access and control hub (140). The present invention also includes a debugger (106) coupled to the interprocess communication device (104) that issues the command (196) to the model access and control hub (140) via the shared memory (105), and receives information from the model access and control hub (140) via the shared memory (105). The present invention also includes an antenna (112) coupled to the model access and control hub (140) for communicating within the system (100), and for receiving and transmitting information.

18 Claims, 5 Drawing Sheets

SYSTEM AND METHOD FOR INTERFACING SOFTWARE AND HARDWARE

TECHNICAL FIELD OF THE INVENTION

The present invention relates in general to computer devices, and, more particularly, to a system and method for interfacing software and hardware.

BACKGROUND OF THE INVENTION

Many electro-mechanical systems use processors to perform operations. Prior to implementation, these processors are tested and debugged to ensure they perform their designed functions. Logic simulation with architecture level visibility into the processors allows internal signals to be probed, logic simulation to check logic levels, and cycle/phase accuracy to be confirmed. If the logic simulation uses device timing, they can perform full timing verifications of the system.

During early stages of processor design, hardware and software comparisons may be done in the system. Generally, these systems have software debug capability under simulation. Additionally, capability to control logic simulation with a debug abstraction, such as break points, single stepping, or interrupt, is desirable. However, these systems result in a significant amount of redesign and redundancy. These considerations particularly are costly when the processor design is in its infancy.

Previous attempts to provide these tests include digital circuitry in the processors that allow debug software to interface with the processors. Further, testability structures may be built into the design system to assess software debug operations. However, these testability structures are tailored to the various design modules, which have different levels of accuracy, such as functions, timing, or memory. These additional testability structures and circuitry increase space and cost considerations in designing the processors.

SUMMARY OF THE INVENTION

From the foregoing, it may be appreciated that a need has arisen for a method for interfacing hardware and software without structures in the design system and additional circuitry on the processors. In accordance with the present invention, a system and method for interfacing hardware and software is provided that substantially eliminates and reduces the disadvantages and problems associated with conventional test interface operations.

In accordance with one embodiment of the present invention, a method of for interfacing hardware and software in a simulation system comprises initializing a cell by resetting the cell and having a model access and control hub store configuration data of blocks on the cell to a shared memory, spawning a debugger, the debugger coupled to the model access and control hub by an interprocess communication device including the shared memory, loading the configuration data to the debugger from the shared memory, formulating and sending a command from the debugger to the model access and control hub via the shared memory in the cell, receiving a signal at the model access and control hub from the blocks at the completion of the executing step, and transmitting the signal to the debugger from the model access and control hub and executing the command on the blocks control hub via the shared memory.

A technical advantage of the present invention is that a system and method for interfacing software and hardware in a simulation system is described. Another technical advantage of the present invention is that it is modular and extendable, and it enables co-simulation over heterogenous, multiprocessor design systems. Another technical advantage of the present invention is that a modular interface is provided that maintains transparency of information exchange between interacting modules of a design system. Another technical advantage is that it allows interfacing between complex design systems with heterogenous processors, each with their own clock rate. Another technical advantage is that a software debugger interface is provided that allows direct access to control and observe processors, and their associated memory modules, without consuming or disturbing the circuitry outside the processors. Another technical advantage of the present invention is that an interface is provided that does not require the existence of any testability structures in the design system to assist in software debug operations. Another technical advantage of the present invention is that a system is provided that is modular and extendable to any number of processors regardless of type. Another technical advantage is that a software and hardware interface is provided to allow logic simulation of designs where the various design modules are simulating at different levels, such as function, timing, or memory. Another technical advantage of the present invention is that a software and hardware interface is provided that allows debug operations to occur in a rapid manner.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

An embodiment of the present invention and its advantages are best understood by referring now in more detail to FIGS. 1–5 of the drawings, in which like numerals refer to like parts. FIGS. 1–5 illustrate an apparatus and method for interfacing hardware and software in accordance with an embodiment of the present invention.

Figure 1A:
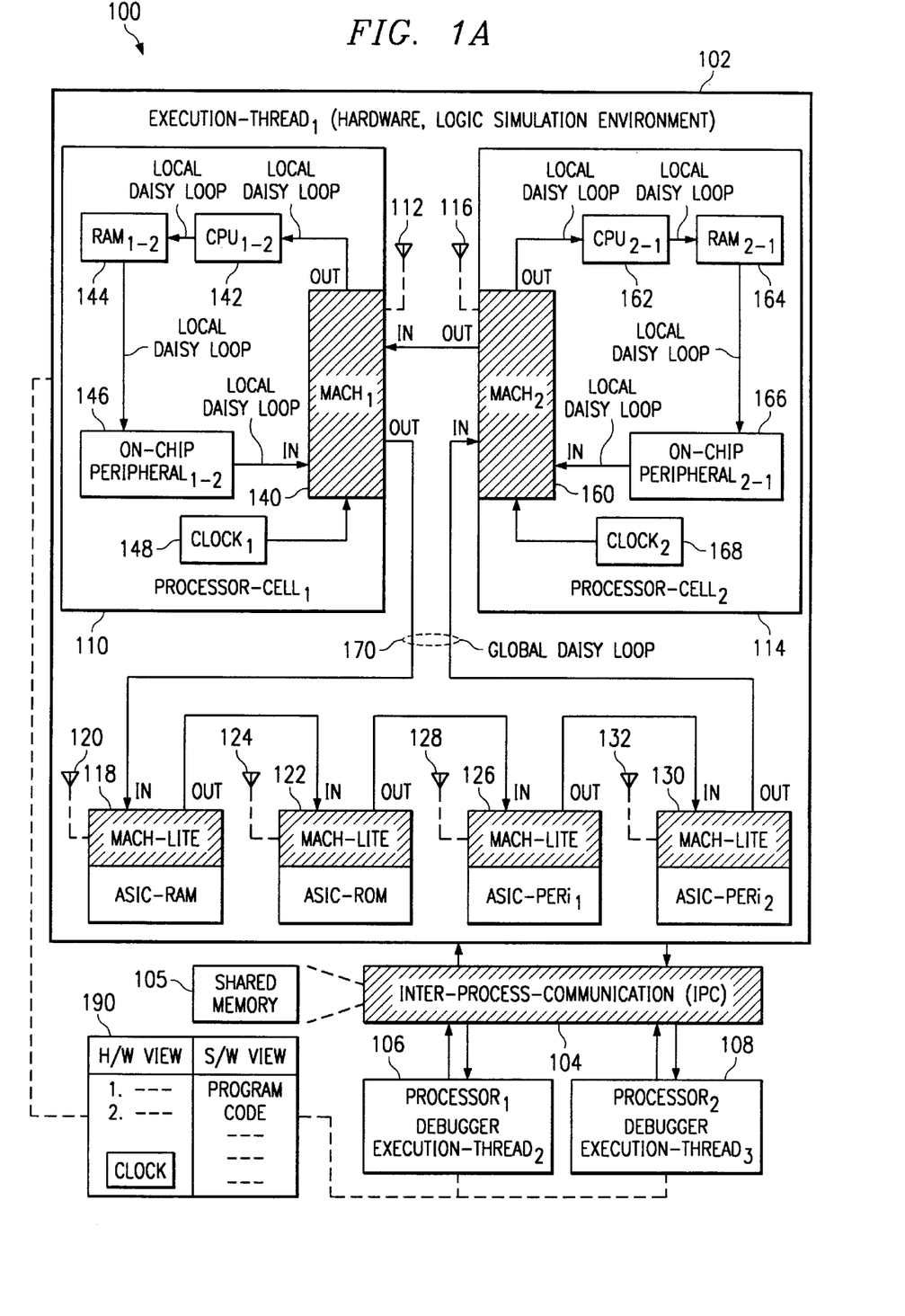
FIG. 1 illustrates a simulation system in accordance with the present invention.

FIG. 1A illustrates a simulation system 100 that allows interfacing between digital system 102 and high level language debuggers 106 and 108. Digital system 102 is a hardware system having processors, cells and logic circuitry. Debuggers 106 and 108 are software high level language components. Simulation system 100 also includes interprocess communication device 104. Digital system 102 includes processor 110 and processor 114. Processor 110 interfaces with debugger 106, and processor 114 interfaces with debugger 108. Digital system 102 also may include additional processors that interface with correlating debuggers. Antenna 112 connects to processor 110. Further, antenna 116 connects to processor 114.

Processor 110 includes model access and control hub ("MACH") 140. MACH 140 is a function module and executes all transactions between debugger 106 and processor 110. MACH 140 also connects to the rest of the blocks on processor 110 to form a local daisy chain, or loop, within processor 110. The configuration items in the local daisy chain are the internal blocks on processor 110. In one embodiment of the present invention, MACH 140 connects to CPU 142 to begin the local daisy chain or loop. CPU 142 connects to RAM 144. RAM 144 connects to peripheral 146. Peripheral 146 connects to MACH 140 to complete the local daisy chain on processor 110. Thus, MACH 140 executes a command on processor 110 by activating the local daisy chain of CPU 142, RAM 144, and peripheral 146. Clock 148 on processor 110 also connects to MACH 140.

Processor 114 is similar to the configuration of processor 110. MACH 160 is the model access and control hub of processor 114. MACH 160 executes commands on processor 114 by activating the local daisy chain, or loop, comprising CPU 162, RAM 164, and peripheral 166. The configuration items in the local daisy chain are internal blocks to processor 114. Clock 168 also connects to MACH 160.

MACH 140 and MACH 160 connect to each other and also connect to a global daisy loop. Connections between internal functional blocks and MACH blocks are made by IN and OUT pins added to each block. Global daisy chain 170 connects MACHs in the processors of digital system 102 to each other. Further, global daisy chain 170 connects the MACHs, including MACH 140 and MACH 160, to cells 118, 122, 126, and 130. Cells 118, 122, 126, and 130 may be application specific logic components supporting digital system 102. For example, cell 118 is a RAM cell that connects to antenna 120. Cell 122 is a ROM cell that connects to antenna 124. Cell 126 is a peripheral cell that connects to antenna 128. Cell 130 is an additional peripheral cell that connects to antenna 132.

Cells 118, 122, 126 and 130 include a MACH component that communicates with other cells and processors IN digital system 102 and performs equivalent functions to the MACHs described above. These module access and control hubs may be known as MACH-lite because, unlike regular MACHs, the modules do not implement instruction single stepping or running that are characteristics of a CPU that executes compiled code. MACH-lite hubs are associated with RAM, ROM, or logic peripherals, such as serial or parallel ports, timers, programmable PLLs, etc. In simulation system 100, a MACH-lite on cells 118, 122, 126 and 130 coordinates the exchange of information such as memory content (read/write) of the RAMs or ROMs. Further, a MACH-lite may coordinate exchange of information regarding register content (read/write) in the control/data registers within the peripherals.

Antennas 112, 116, 120, 124, 128, and 132 allow communication between cells and processors directly. Communication between cells and processors in digital system 102 may be performed in two ways. First, commands and instruction may be posted along global daisy chain 170 from one cell or processor to another in succession. For example, processor 110 communicates commands or instructions through its OUT pin to cell 118's IN pin. Cell 118 then relays the command or instruction through its OUT pin to cell 122's IN pin. The command or instruction relays across global daisy chain 170 until it is received by MACH 140 and processor 110. MACH 140 receives an indication whether the command has been processed by the other processors or cells.

The second method of communication in digital system 102 is communication via the antennas connected to the processors and cells. This direct global communication is a star network configuration instead of the ring network configuration of global daisy chain 170. The antenna ports, such as antennas 112 and 116, provide a point-to-point type of communication across individual processors and memory cells without activating global daisy chain 170. A MACH, or MACH-lite toggles a signal on the receiving MACH, or MACH-lite by using the native logic simulator's procedural interface function. This toggling activity drives a pin designated by a unique hierarchical pathname to a predefined logic state such as 1 or 0. The hierarchical path to the pin, or antenna port, is retrieved by reading a design configuration data file during startup operations. The configuration data allows MACH modules to pick the target MACH, or MACH-lite, to answer the query or process the command. If more than one module or an arrayed memory is to be toggled, then the initiating MACH triggers the antenna ports of all the target MACHs, or MACH-lites, appropriately.

Interprocess communication device 104 communicates with digital system 102. Interprocess communication device 104 receives the commands from the individual processors and cells in digital system 102. Interprocess communication device 104 also communicates with debuggers 106 and 108 in simulation system 100. Debuggers 106 and 108 run separate software processes from the hardware simulations executed in digital system 102. Information is shared or communicated between digital system 102 and debuggers 106 and 108, via interprocess communication device 104. Simulation system 100 creates communication device 104 during initialization.

Interprocess communication device 104 utilizes shared memory 105 and semaphores to facilitate communication between digital system 102 and debuggers 106 and 108. In an embodiment of the present invention, shared memory 105 may be in the form of a bulletin board and the semaphores may be used for process synchronization and arbitration to the bulletin board. Further, shared memory 105 may be of a structure to allow communication between MACHs 140 and 160 and debuggers 106 and 108. The configuration of shared memory 105 and the semaphores as interprocess communication vehicles is selected on ease of use, performance and availability.

The simulation system 100 also includes a display 190. Display 190 is coupled to digital 102 and debuggers 106 and 108. Display 190 displays in formation pertaining to simulation operations on digital system 102 and the program code in debuggers 106 and 108. In an embodiment, display 190 has a hardware view and a software view. The hardware view displays waveforms, values, and other data as a result of simulation operation on digital system 102. The hardware view also may include a clock or time display. The software view includes program code pertaining to the debuggers and their commands. Thus, an operator, or user, may view hardware simulation results as the commands from the debuggers are processed.

Figure 1B:
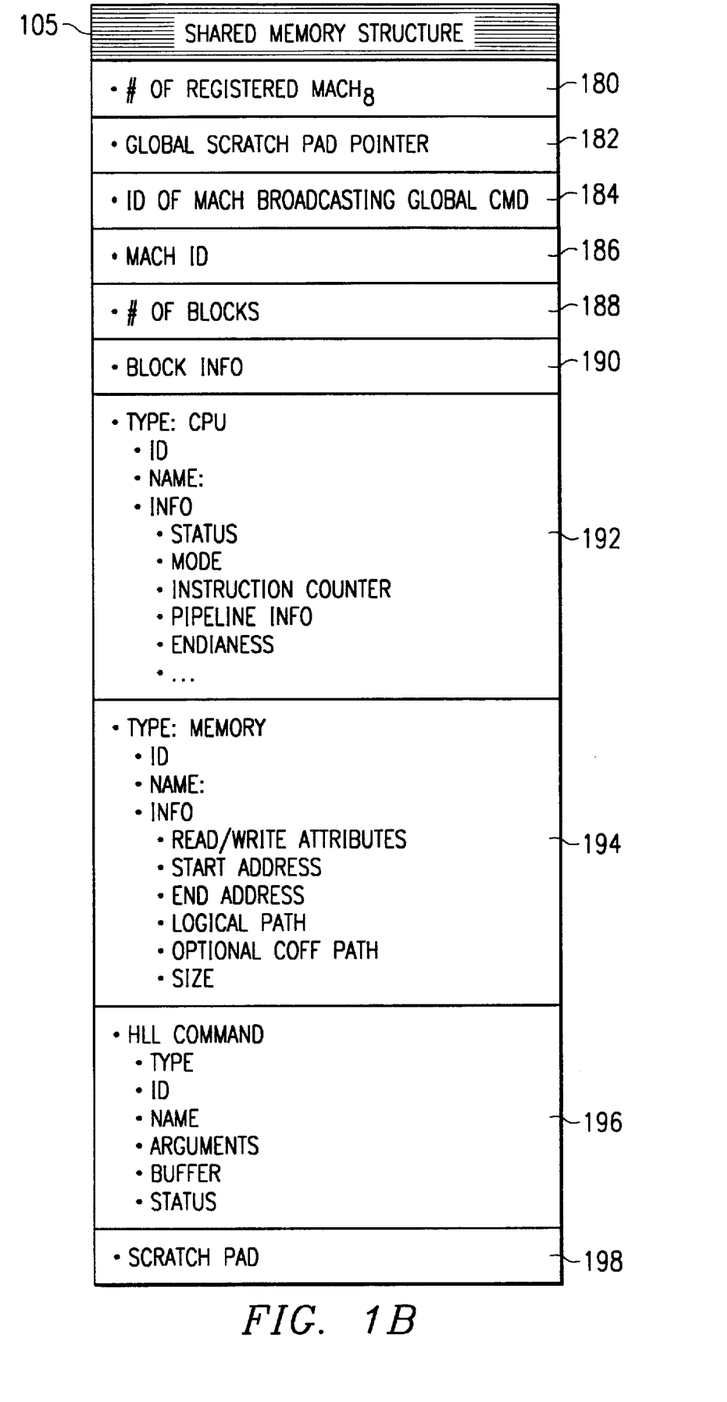

FIG. 1B illustrates a configuration of shared memory 105 in accordance with an embodiment of the present invention. Shared memory 105 is part of interprocess communication device 104. Shared memory 105 is created during initialization operation by MACH blocks on digital system 102 and comprises registers, or blocks, that store configuration data collected by the MACHs. Shared memory 105 allows the MACH blocks on the processors and cells in digital system 102 to communicate with their respective debuggers within simulation system 100. The MACHs and debuggers write and read information from shared memory 105.

Block, or register, 180 of shared memory 105 represents the number of registered MACHs that have initialized during initialization operations on simulation system 100. As each MACH is initialized, block 180 increments. Global scratchpad pointer 182 indexes into global scratchpad area 198 at the bottom of shared memory 105. As each local daisy loop for each processor and cell completes initialization, pointer 182 advances. Block 184 represents the identifier of a MACH making a global command broadcast. Whenever a command cannot be fully processed on the blocks of a local daisy chain toggled by a MACH, the MACH broadcasts the command within digital system 102 so that other processors and cells may process the command. During the global broadcast, the MACH identifies itself by placing its identifier in this field for the benefit of the responding MACH. If this field is void, then no command is being broadcast globally.

Block 186 represents a MACH identifier. Each MACH in digital system 102 has a segment of shared memory with information pertaining to all relevant internal blocks. Block 186 represents the MACH identifier in the shared memory, and also marks the start of its own database at the end of the previous MACH's database. Block 188 represents the number of blocks on the local daisy chain pertaining to the MACH identified in block 186. Block 188 stores the amount of blocks connected in the local daisy chain of the MACH identified in block 186. Block 190 represents the block information and identifier of each mega cell internal block on the local daisy chain of the MACH identified in block 186.

In an embodiment of the present invention, cells having MACH-lite modules do not participate in creating resources in interprocess communication device 104. The interprocess communication device 104 and shared memory 105 creation only is performed by MACHs. MACH-lite cells, such as cells 118, 122, 126 and 130, occupy predefined space inside shared memory 105 created by the MACHs, and stores a module type and identifier information. In an alternative embodiment, MACH-lite cells initialize and create space in shared memory 105 like MACHs.

Block 192 represents block characteristics and configuration information for the block identified in block 190. The information is stored on shared memory 105 during initialization operations. Block 194 is another representation of block information and configuration information stored during initialization. Additional blocks similar to blocks 192 and 194 may be added to shared memory 105 as desired by simulation system 100. Block 196 represents a high level language command from a debugger that correlates to the MACH identified in block 186. Further, debugger configuration information may be stored in block 196.

Global scratchpad 198 is at the high address of shared memory 105. Global scratchpad 198 transfers bulk data during operations in simulation system 100. Transactions, such as read/write to a block on processor memory, utilize global scratchpad 198. After initialization operations create shared memory 105, the entire region following the headers is the scratchpad area. As each processor initializes on digital system 102, global scratchpad pointer 182 adjusts itself in global scratchpad 198 to store configuration information.

In an alternative embodiment of the present invention, shared memory 105 may be configured dynamically such that each module on the daisy chain acquires memory, or repository, in shared memory 105 that accommodates the necessary information for that particular module, or MACH. Within the claimed memory in shared memory 105, the particular module saves it type and identifier, plus updates a global header record for the repository in shared memory 105 to indicate the initiation of a new module.

Referring back to FIG. 1A, in an embodiment of the present invention, MACH 140 and MACH 160 initialize by registering their identifiers in interprocess communication device 104 at block 186. The identifier is used when a command is received from debuggers 106 and 108, or is broadcasted across global daisy chain 170 or antennas 112 or 116 to obtain the status of digital system 102.

Debuggers 106 and 108 exchange information with digital system 102 via interprocess communication device 104. Debuggers 106 and 108 use semaphores created by MACHs to communicate with interprocess communication device 104. Debuggers 106 and 108 query and perform simulation operations on processors and cells in digital system 102 by active and passive commands. These commands may be issued singularly, or, alternatively, in "packets." Command packets are blocks of instructions that perform simulations and digital system 102. MACHs process the command packets to test components in digital system 102. The simulation operations debug the processors and cells in digital system 102.

Active commands require a processor to consume a root clock cycle and advance simulation time steps. Active commands also result in the consumption of external world electrical stimuli and may cause electrical signals to be output from hardware within digital system 102. These commands may be RUN and STEP commands, or instructions. The RUN command updates display 190 at the end of a command packet, or block of instruction. The STEP command updates display 190 for each command executed inside each packet.

Passive commands query a processor with zero delay and without advancing the simulation time step or consuming any root clock cycles. Passive commands do not consume outside world electrical stimuli. Thus, passive commands do not disturb surrounding logic circuitry. Passive commands may provide a peek or poke visibility into digital system 102. Passive commands also include setting a breakpoint or clearing a breakpoint. However, active commands, such as RUN or STEP, may be used to run up to a preset breakpoint. In an embodiment, debuggers 106 and 108 support the following basic symbolic debug commands: read/write to processor registers, examine processor pipeline, read/write to program memory, read/write to data memory, program flow control and open watch windows for programs variables, clock counter, and instruction execution counter. Further, debuggers 106 and 108 formulate other commands, as needed and known to one skilled in the art, that query the status and capabilities of the processors themselves and digital system 102.

Simulation system 100 operates by providing a high level language debugger for each processor on digital system 102. By using interprocess communication device 104, debuggers communicate with processors without being connected to digital system 102. Thus, a modular interface is provided that allows any number of debuggers to communicate with processors in digital system 102. For example, debugger 106 communicates with 110, and debugger 108 communicates with 114. Debugger 106 and 108 are spawned as child processes by the corresponding design modules that simulates under native logical simulator. Normal hardware debug operations on digital system 102 use the logic simulator command and control menus.

Debuggers 106 and 108 exchange information with digital system 102 via shared memory 105. Semaphores arbitrate communication between the debuggers and the simulation models. In the logic simulation environment, electrical dummy signals are used to activate relevant modules, such as MACHs 140 and 160, to process commands in a command packet from debuggers 106 and 108. These signals run through the local daisy chain, or loops, inside each processor in digital system 102 The processors in digital system 102 network to form global daisy chain, or loop, 170. Whenever a MACH on the local loop is activated, the MACH checks shared memory 105 of interprocess communication device 104 to determine if a command from its respective debugger is waiting to be processed.

If the MACH is able to process the command and reply to the debug query, the MACH writes the reply onto shared memory 105 of interprocess communication device 104. If the MACH is unable to process the command, the command passes through the local daisy chain to the internal blocks, or modules, on the processor. If the MACH and the local daisy chain are unable to process the debug command, the processing activity shifts onto global daisy chain 170 or the command may be broadcast globally to other processors and cells through the MACH's antenna. The same sequence of events repeats itself for each processor core/memory module in digital system 102 until the original processor's debugger receives an answer or reply to its command query.

For example, debugger 106 formulates a command packet in response to an input and communicates commands in command packet to interprocess communication device 104. The input relates to a desired simulation operation or status on digital system 102. Interprocess communication device 104 contacts processor 110, which corresponds to debugger 106. Interprocess communication device 104 may contact processor 110 via antenna 112. MACH 104 checks shared memory 105 on interprocess communication device 104 to determine what the command is from debugger 106.

If MACH 140 is able to process the command, then the reply is written onto shared memory 105. If MACH 140 is unable to reply, then the local daisy chain, or loop, of processor 110 activates. MACH 140 passes the command to CPU 142. CPU 142 passes the command to RAM 144 if CPU 142 is unable to process the command. RAM 144 passes the command to peripheral 146 if unable to process, and so on. If none of the internal blocks of processor 110 are able to process the command, the command returns to MACH 140. MACH 140 then passes the command onto global daisy chain 170. Alternatively, the command may be broadcast globally through antenna 112. Module access control hubs receive the command in their respective processors and the daisy chain sequence repeats on each processor in digital system 102.

Figure 2:
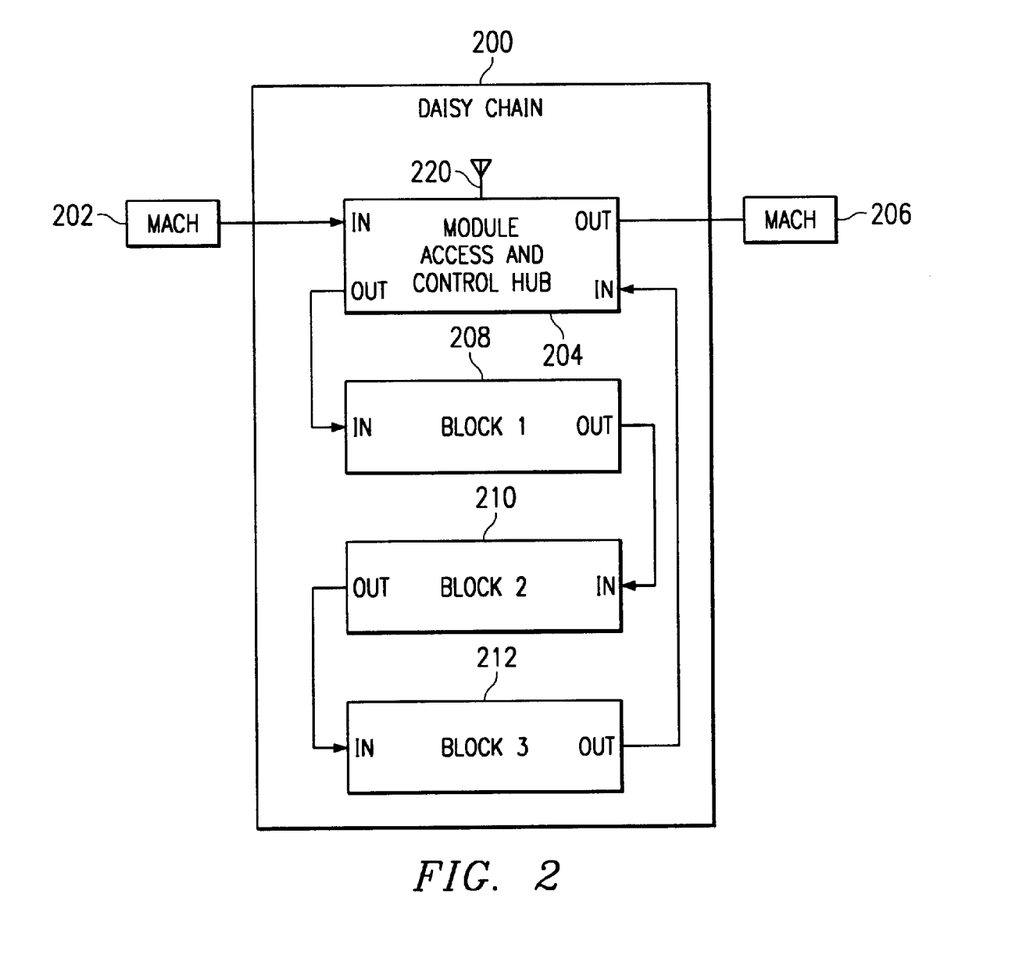
FIG. 2 illustrates a local daisy chain on a processor in accordance with the present invention.

FIG. 2 illustrates a local daisy chain, or loop, in accordance with an embodiment of the present invention. MACH 202 passes a debug command to MACH 204 on processor 200. MACH 202 passes the command by toggling MACH 204's IN pin. MACH 204 receives the command and determines whether it is able to process the command directly. If unable to process the command, MACH 204 toggles the local OUT pin and passes the command onto the local daisy chain. Blocks 208, 210 and 212 represent internal blocks on processor 200. Processor 200 may be a microcontroller processor. Alternatively, processor 200 may be a digital signal processor. Blocks 208, 210 and 212 may represent CPUs, RAMs, ROMs, peripherals, or any other internal blocks generally found on a processor.

MACH 204 passes the command onto the local daisy chain and toggles the IN pin on block 208. Block 208 determines whether it is able to process the command. If able to process, block 208 notifies MACH 204 and relays the reply accordingly. If unable to process, block 208 toggles its OUT pin and passes the command onto the local daisy chain. The local daisy chain toggles the IN pin of block 210 and passes the command. Block 210 determines whether it is able to process the command and toggles its OUT pin if unable to process. The command again passes onto the local daisy chain. The local daisy chain toggles the IN pin of block 212 and passes the command. Block 212 determines whether it is able to process the command and responds accordingly. If block 212 is unable to reply, the OUT pin is toggled and the command passes back to MACH 204. Thus, the local daisy chain toggles the IN pin on MACH 204 if none of the blocks on processor 200 are able to process the command. MACH 204 then passes the command out onto the global daisy chain and to MACH 206. Alternatively, MACH 204 may broadcast the command globally through antenna 220.

Figure 3:
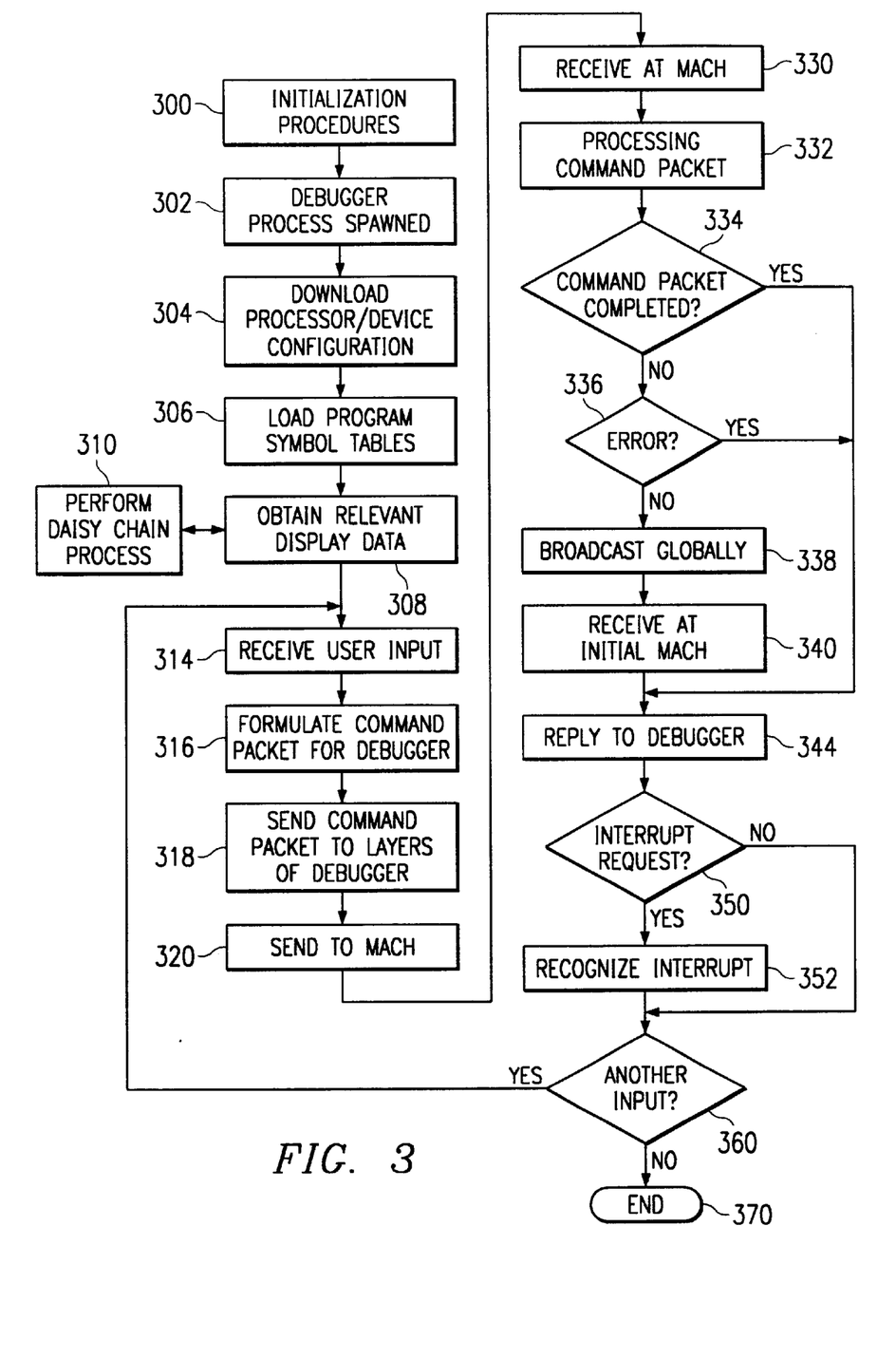
FIG. 3 illustrates a flowchart depicting a method for interfacing hardware and software to perform debug operations in a simulation system in accordance with the present invention.

FIG. 3 illustrates a method for interfacing hardware and software to perform debug operations in accordance with one embodiment of the present invention. Step 300 executes by performing initialization procedures within digital system 102. These initialization procedures are discussed below with reference to FIG. 5. During step 300, the MACHs in digital system 102 initialize and open communication channels in interprocess communication device 104. For example, MACH 140 creates and initializes shared memory 105 and the semaphores between itself and interprocess communication device 104. If interprocess communication device 104 has already been set up by another MACH, then no new interprocess communication devices are created. Each MACH, however, claims a fixed amount of space in shared memory 105 on interprocess communication device 104. The size of shared memory 105 depends on the number and types of blocks that are in the MACHs' local daisy chains. Further, step 300 resets processor 110's program counter. Other critical processor registers and status flags properly initialize after the reset.

Completion of reset operations are recorded in shared memory 105 in interprocess communication device 104. Processor 110 toggles its local daisy chain via MACH 140. All blocks on the local daisy chain respond one after the other. The blocks register their configuration information in shared memory 105 at a location identified by MACH 160. The blocks also indicate that they have completed proper initialization and are now in a known state.

In discussing the method according to the present invention, reference will be made to processor 110, MACH 140 and debugger 106. The method, however, is applicable to any processor, such as processor 114, or cell, within simulation system 100.

When the blocks on processor 110 are reset correctly and store their configuration step 302 executes by spawning debugger 106 as a child process. Processor 110 passes applicable interprocess communication identifiers as environment variables to debugger 106. Debugger 106 reads the interprocess communication identifiers from the environment variables and uses these identifiers to gain access to shared memory 105 and the semaphores set up by MACH 140. Step 304 executes by having debugger 106 utilize low level functions to extract and download processor 110 configuration information from shared memory 105. These functions read data directly off shared memory 105 and relay the data to debugger 106. Debugger 106 performs a proper target initialization by defining processor 110's configuration.

Step 306 executes by loading program symbol table information to debugger 106. The symbol table information is useful for providing symbolic debug via debugger 106. This information includes line numbers and variable names used during program source disassembly and display. Debugger 106 loads the symbol tables by fetching the path name of the program file. The symbol table information allows debugger 106 to display the program source, or disassembly, window on display 190. In an embodiment, the symbolic information does not load onto the hardware memory models, or digital system 102. Step 308 executes by obtaining all relevant display data from MACH 140, or directly from shared memory 105. This display data may include processor register values, program source and data information. If the display data is to be obtained from MACH 140, then step 310 executes by performing a local daisy chain process on processor 110. Debugger 106 sends passive command to processor 110 that retrieves processor register values and other necessary information. After relevant display data is retrieved, debugger 106 is updated with the display data.

During the execution of steps 302–310, simulation on processor 110 has been suspended. MACH 140 remains inactive as debugger 106 is spawned. From a simulation time stand point, processor 110 has just completed the proper reset and no additional external stimuli has been consumed. When debugger 106 sends active commands to MACH 140, MACH 140 activates and advances time steps as simulation is resumed.

Step 314 executes by polling test system 100 and receiving user input to determine what command is to be processed in testing digital system 102. User input may be received by polling a keyboard and/or mouse coupled to test system 100. Alternatively, the input may be system defined. After receiving the input, step 316 executes by having debugger 106 formulate a command packet having commands to be sent to digital system 102. The command packet includes a series of commands or instruction that perform simulation operations on digital system 102.

Step 318 executes by sending the commands in the command packet down through the layers of debugger 106. Debugger 106 is a multi-layered software component. The lower layers are closer to digital system 102 than the higher layers. Thus, debugger 106 processes a command packet at a given time with initial commands residing in the lower layers of debugger 106. Step 320 executes by placing the command from debugger 106 onto shared memory 105. MACH 140 retrieves the command off shared memory 105 during the next clock sequence in step 330.

After the command is received at MACH 140, step 332 executes processing the command packet. MACH 140 may process the command packet by performing a local daisy chain process on processor 110. The local daisy chain process is discussed in detail with reference to FIG. 4 below. After command packet processing is completed, step 334 executes to determine whether the command packet from debugger 106 was processed and completed. If the command packet was not able to be processed within processor 110, then step 336 executes to determine whether an error occurred during the command packet processing. If an error did not occur, then step 338 executes by sending the command, or command packet, through global daisy chain 170, or globally broadcasting the command packet through antenna 112 so that the command packet may be received by other MACHs and processed. Other MACHs in digital system 102 process the command packet via their respective local daisy chains. After the command packet has gone through global daisy chain 170, or processed globally, step 340 executes by receiving the command packet back at MACH 140, which is the initial MACH receiving the command packet from debugger 106.

If the command packet has been processed and completed in step 332, then step 344 executes by replying to debugger 106. The reply is made by placing the response in shared memory 105 by MACH 140. Debugger 106 queries shared memory 105 to see if a reply has been received. Further, if an error is determined in step 336, then step 344 executes by informing debugger 106 an error has occurred during simulation operations on processor 110. Moreover, after step 340 executes by receiving the command packet after distribution amongst global daisy chain 170, step 344 executes by placing the appropriate reply to debugger 106 in shared memory 105 by MACH 140.

Step 350 determines whether an interrupt request has been received at MACH 140. An interrupt request may be a breakpoint instruction. Alternatively, the interrupt request may be a hardware interrupt from the user. Interrupts are recognized after outstanding command packets have been processed. If an interrupt has been received, then step 352 executes by recognizing the interrupt, and stopping simulation in simulation system 100. For example, MACH 140 recognizes the interrupt command, MACH 140 toggles the local daisy chain on processor 110. The internal blocks of the local daisy chain on processor 110 respond to the interrupt command and write their current status onto their respective regions in shared memory 105. Typically, all of the processor register values update in shared memory 105. After the daisy chain activity returns back to MACH 140, MACH 140 acknowledges interrupt operations are completed. MACH 140 sends the appropriate semaphore commands to debugger 106 via shared memory 105 and shuts down. MACH then awaits for a response from debugger 106 before resuming operations.

Interrupt tasks may include extracting current context information from processors and cells in digital system 102, updating screen data, performing other user commands and updating breakpoints. Further, debugger 106 may send passive commands to MACH 140 on the status of processor 110. Debugger 106 sends an active command via shared memory 105 to terminate the interrupt and alerts MACH 140 that the interrupt process is completed and normal operations are to be resumed. Further, MACH 140 may query the stored block data on shared memory 105 and return blocks on processor 110 to their state prior to interrupt.

After debugger 106 has received a reply to the command packet issued in step 318, step 360 executes by determining whether another input is to be received. In other words, if another command packet is to be processed to perform simulation operations, then an input is retrieved by debugger 106. Thus, if step 360 is yes, then step 360 executes by receiving another input. If step 360 is no, then all commands have been processed and resolved, and step 370 executes by completing the simulation interface.

Figure 4:
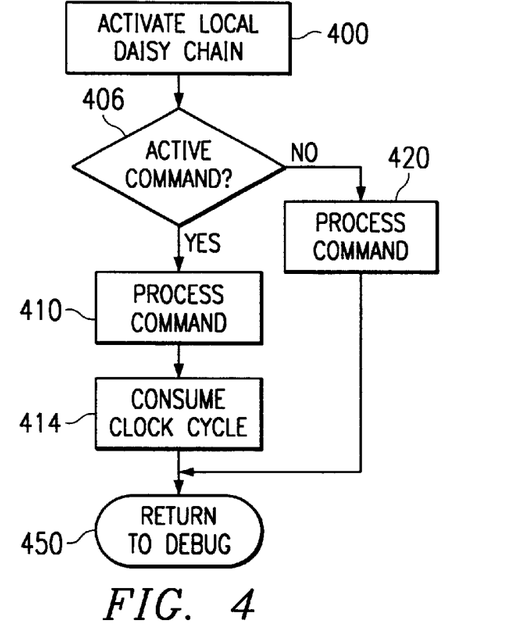
FIG. 4 illustrates a flowchart depicting a method for performing a local daisy chain operation in accordance with the present invention.

FIG. 4 illustrates a method for performing a local daisy chain operation in accordance with one embodiment of the present invention. For reference purposes, the discussion will refer to debugger 106 and processor 110 in disclosing the method. Other processors and debuggers, however, on digital system 102 also implement the method disclosed below.

Step 400 executes by activating the local daisy chain in processor 110. MACH 140 activates the local daisy chain by toggling its OUT pin to send the command onto the local daisy chain. Step 406 executes by determining whether the command is an active command.

If the command is an active command, then step 410 executes by processing the command on block 1 of the local daisy chain. All blocks on processor 110 process the command to determine if the command may be resolved within processor 110. Step 414 executes by consuming a clock cycle because the command received is an active command.

If the command is not an active command in step 406, then the command is a passive command and step 420 executes. Step 420 executes in the same fashion as step 410 by processing the passive command. Step 422 executes when the command is processed on the local daisy chain. No clock cycles are consumed because the command is passive.

Figure 5:
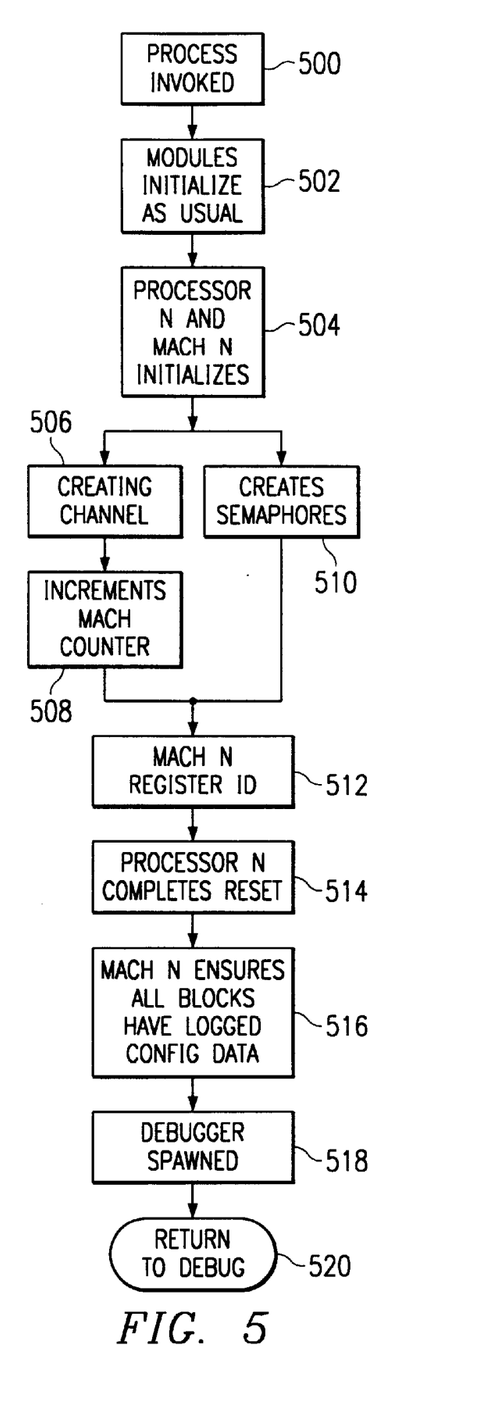
FIG. 5 illustrates a flowchart depicting a method for initializing a simulation system in accordance with the present invention.

FIG. 5 illustrates a method for initializing simulation system 100 in accordance with an embodiment of the present invention. The method depicted in FIG. 5, and described below, correlates to step 300 in FIG. 3. Step 500 executes by invoking the simulation process on simulation system 100. All processors and cells having MACH blocks in digital system 102 are initialized. For example, simulation system 100 alerts processors 110 and 114 and cells 118, 122, 126 in 130 in digital system 102 that they are to be initialized. Step 502 begins initialization by resetting all processors and cells on digital system 102 to zero. After the processors and cells have reset, step 504 executes by alerting the MACH blocks on the processors and cells and digital system 102 that they are to initialize, load their configuration data into shared memory 105, and spawn their respective debuggers. For example, MACH 140 on processor 110 receives an initialization instruction. MACH 140 ensures clock 148 has reset processor operations to zero.

Step 506 executes in the MACH blocks by creating communication channels to shared memory 105. For example, MACH 140 creates a communication channel to shared memory 105 on interprocess communication device 104. If interprocess communication device 104 does not exist, MACH 140 creates interprocess communication device 104 during this step. MACH 140 claims a fixed amount of space in shared memory 105. The size of the claimed space depends on the number and type of blocks that are connected to MACH 140's local daisy chain. Step 508 executes by incrementing the number of registered MACHs' counter in block 180 in shared memory 105's global header. For example, MACH 140 increments block 180 depicted in FIG. 1B. Further, MACH 140 also sets global scratchpad pointer 182 to point to the word immediately following the end of its own records in shared memory 105.

Step 510 executes by creating semaphores when the MACHs initialize. Semaphores perform task synchronization and shared memory access arbitration between digital system 102 and debuggers 106 and 108. Each MACH block creates and initializes a semaphore with two elements. One element is used by digital system 102 to signal the appropriate debugger, while the second element is used by the debuggers to signal digital system 102. A third element also may be created that allows processors and debuggers to communicate with ASIC logic cells in digital system 102. Step 512 executes by registering the MACH identifiers in the global header portion, or block 186, of shared memory 105. For example, MACH 140 registers its identifier in block 186 of shared memory 105.

After the MACHs register their respective identifiers, step 514 executes by having the processors complete reset operations. Reset operations are complete when critical processor registers and status flags are properly initialized. The completion of reset operations is recorded in shared memory 105. The completion toggles the respective MACH blocks to begin initialization through their local daisy chains. Thus, step 516 executes by having the MACHs 140 toggle their local daisy chain. For example, MACH 140 toggles the local daisy chain on processor 110. CPU 142, RAM 144 and peripheral 146 register their configuration information in shared memory 105 during the local daisy chain operation. This information is stored in blocks 190 and 192 of shared memory 105. Further, CPU 142, RAM 144 and peripheral 146 indicate they have completed proper initialization and are now in a known state for simulation operations.

After the MACH's determine that all blocks and their respective local daisy chains have reset correctly and their configuration is stored, step 518 executes by spawning the respective debuggers that correlate to the processors and cells in digital system 102. For example, MACH 140 spawns debugger 106 as a child process and passes to debugger 106 all the interprocess communication identification numbers and semaphores created in steps 506 and 510 as environment variables. Thus, debugger 106 gains access to shared memory 105 and the semaphores created by MACH 140. Debugger 106 calls low-level functions to extract processor 110 configuration information. The low level functions read the data directly from shared memory 105 and relay it to debugger 106. Debugger 106 then performs a proper target initialization by defining the configuration needed to simulate digital system 102. Debugger 106 also calls routines that fetch the path name of the program file that loads symbol table information. This information allows debugger 106 to retrieve line numbers and variable names that are used during program source disassembly and display.

During step 518, necessary information on configuration, identification variables and semaphores are obtained by debugger 106 by either directly reading off shared memory 105 or sending passive commands to MACH 140. Memory is shared in shared memory 105, thus, not requiring the implementation of any caching techniques. Further, debugger 106 does not make direct contact with digital system 102 or processor 110. Moreover, because the debuggers are spawned by the configuration data and semaphores provided by the individual MACHs, the debuggers automatically are compatible without modifying structures within simulation system 100. Any processor configuration may be simulated in accordance with the described method. Once debugger 106 is spawned and initialized, step 520 executes which returns simulation system 100 to debug operations.

Thus, it is apparent that there has been provided, in accordance with one of the embodiment of the present invention, a system and method for interfacing hardware and software in a simulation system that satisfies the advantages set forth above. Although the present invention has been described in detail, it should be understood that various changes, substitutions, and alterations may be made herein. Other examples are readily ascertainable by one skilled in the art and can be made without departing from the spirit and the scope of the present invention as defined by the following claims.

What is claimed is:

1. A system for interfacing software and hardware components, comprising:
   at least one cell having a model access and control hub and at least one block within the cell connected to the model access and control hub, wherein the at least one block executes a command sent by the model access and control hub;
   an interprocess communication device including a shared memory coupled to the model access and control hub, the shared memory communicating the command to the model access and control hub;
   a debugger coupled to the interprocess communication device that issues the command to the model access and control hub via the shared memory and receives information from the model access and control hub via the shared memory; and
   an antenna coupled to the model access and control hub for communicating within the system and for receiving and transmitting information.

2. The system of claim 1, wherein the shared memory comprises registers, status flags, a global scratch pad and a global scratch pad pointer.

3. The system of claim 1, wherein the at least one cell is a digital signal processor.

4. The system of claim 1, wherein the at least one cell is a microcontroller processor.

5. The system of claim 1, further comprising an interrupt device, wherein the interrupt device suspends command executions in the at least one cell.

6. The system of claim 1, wherein the at least one block has an input toggle and an output toggle, the toggles activated by a signal from the model access and control hub.

7. The system of claim 1, wherein the model access and control hub of the at least one cell is coupled to a plurality of model access and control hubs by the antenna, the plurality of model access and control hubs form a star network within the system.

8. The system of claim 1, wherein the command to be issued by the debugger is a passive command.

9. The system of claim 1, wherein the command to be issued by the debugger is an active command.

10. The system of claim 1, wherein the at least one cell further comprises a clock, the clock sending a clock signal to the model access and control hub.

11. The system of claim 1, further comprising a random access memory connected to the at least one cell.

12. The system of claim 1, further comprising a read-only memory connected to the at least one cell.

13. A method for interfacing software and hardware, the method comprising the steps of:
   initializing a cell by resetting the cell and having a model access and control hub store configuration data of at least one block on the cell to a shared memory;
   spawning a debugger, the debugger coupled to the model access and control hub by an interprocess communication device including the shared memory;
   loading the configuration data to the debugger from the shared memory;
   formulating and sending a command from the debugger to the model access and control hub via the shared memory;
   executing the command on the at least one block in the cell by performing a daisy chain operation on the at least one block on the cell;
   receiving a signal at the model access and control hub from the at least one block at the completion of the executing step; and
   transmitting the signal to the debugger from the model access and control hub via the shared memory.

14. The method of claim 13, further comprising the step of:
   sending the command from the model access and control hub through an antenna to a plurality of model access and control hubs upon completion of the receiving step.

15. The method of claim 13, further comprising the step of:
   interrupting operations on the cell when an interrupt is received in the model access and control hub from the debugger.

16. The method of claim 13, wherein the formulating step includes receiving user input.

17. The method of claim 13, wherein the formulating step includes receiving values stored in a memory.

18. A system for interfacing software and hardware components, comprising:
   a plurality of processor cells with each cell having a model access and control hub connected to other blocks in the cell to form a daisy chain with at least one block within the cell connected to the model access and control hub, wherein the at least one block executes a command sent by the model access and control hub;
   an interprocess communication device including a shared memory coupled to the model access and control hub for each cell, the shared memory communicating the command to each model access and control hub;
   a debugger coupled to the interprocess communication device that issues the command to each model access and control hub via the shared memory and receives information from each model access and control hub via the shared memory; and
   each cell including an antenna coupled to the model access and control hub for communicating with the model access and control hubs of other cells to form a star network within the system for receiving and transmitting information.

* * * * *